Aug. 7, 1973  J. S. ZANKOWSKI  3,751,351
ELECTROLYTIC CELL FOR RECOVERING METAL FROM A SOLUTION
CONTAINING IONS THEREOF, AND METHOD FOR OPERATING SAME
Filed March 15, 1971

JOHN S. ZANKOWSKI
INVENTOR.

BY Henry M. Chapin

ATTORNEY 3,751,351
ELECTROLYTIC CELL FOR RECOVERING METAL FROM A SOLUTION CONTAINING IONS THEREOF, AND METHOD FOR OPERATING SAME
John S. Zankowski, Rochester, N.Y., assignor to Eastman Kodak Company, Rochester, N.Y.
Filed Mar. 15, 1971, Ser. No. 124,196
Int. Cl. C22d 1/02; C23b 5/26
U.S. Cl. 204—109         11 Claims

ABSTRACT OF THE DISCLOSURE

An electrolytic cell comprises spaced parallel flat anode and cathode, an annular wall of dielectric material between the two and forming an internal chamber, a spiral partition of dielectric material in the chamber, an inlet for electrolyte solution adjacent one end of the spiral, and an outlet for electrolyte solution adjacent the opposite extremity of the spiral. The spiral partition can be self supporting, or supported by posts which add to turbulence. In a preferred modification two of such cells are provided having the cathode as a common wall. In one cell the inlet is at the outer end of the spiral and the outlet is at the inner end and through the center of the cathode, thus forming the inlet of the second cell, with the outlet from the second cell being at the outer end of the spiral.

BACKGROUND OF THE INVENTION

Field of the invention

This invention relates in general to electrolytic recovery of metals and in particular to a novel electrolytic method and apparatus for recovering a metal from a solution containing ions of the metal, for example, recovering silver from exhausted photographic fixing solutions. More specifically, this invention relates to an electrolytic cell through which a metal-ion-containing solution is circulated in order to plate out the metal on an electrode surface from which it can be readily removed.

Description of the prior art

Recovery by electrolytic techniques of a metal from a solution which contains ions of such metal is well known. In its simplest terms, the process involves immersing a pair of electrodes in the electrolytic solution and impressing across the electrodes a voltage of sufficient magnitude to effect migration of the metal ions to the cathode and deposition of the metal on the cathode surface in the form of a coherent plate which is subsequently removed. Regardless of the design of the apparatus employed, it has long been recognized that effective agitation of the solution must be provided to achieve a reasonable efficiency of recovery. Many of the electrolytic cells heretofore utilized for this purpose provide mechanical agitation of the solution by the use of inter-electrode stirring devices, e.g., rotating paddle wheels or impellers positioned between anode and cathode. Such cells are typically of rather complex construction and must provide a relatively large space between anode and cathode to accommodate the stirring device. As a result of this large electrode spacing, the diffusion path for the metal ions is long and the need for thorough agitation of the solution is correspondingly increased. Moreover, because of the location of the stirring device, only a relatively thin layer of metal can be permitted to build up on the cathode before it becomes necessary to strip it off so as to avoid the possibility of contact with the stirring device. Electrolytic cells in which agitation of the electrolytic solution is provided solely by means of fluid flow, so that mechanical stirring devices are not needed, have also been proposed heretofore; but these cells confine the solution within an annular chamber between concentrically disposed cylindrical electrodes and, consequently, are usually quite complex in design.

SUMMARY OF THE INVENTION

In accordance with this invention, there is provided an electrolytic cell of novel construction which effectively avoids the disadvantages of the apparatus of the prior art referred to hereinabove. As compared with cells comprised of concentrically disposed cylindrical electrodes, the apparatus of this invention has the advantage of greater simplicity in construction, while still eliminating the need for interelectrode stirring devices, and it also provides an improved configuration for current flow with the result that higher current densities than were heretofore feasible can be used.

The electrolytic cell of this invention is comprised of a pair of oppositely disposed sheet electrodes sealed to and separated by an electrically non-conductive spacing element which is of such configuration that together with the electrodes it defines a thin generally disk-shaped chamber. An electric potential of appropriate magnitude is impressed across the electrodes by any suitable means. The solution undergoing treatment is circulated through the disk-shaped chamber at a high rate in such manner as to establish a spiral flow path, this being accomplished by providing a spiral partition of dielectric material within the chamber engaging at its edges both the anode and the cathode and so constructed and arranged as to form a spiral path extending from the periphery of the chamber to the center for the flow of electrolyte (e.g. silver-bearing photographic fixing solution). An inlet for electrolyte solution is located adjacent one end of the spiral partition (advantageously adjacent the periphery of the chamber), and an outlet is located adjacent the opposite end (advantageously at about the center of the chamber).

In a preferred embodiment first and second chambers are provided, using a single cathode as a common wall, and two anodes spaced on opposite sides of the cathode. Both chambers contain similar spiral partitions, and the outlet of the first chamber opens into the second chamber (advantageously at the center) so that the electrolyte flows spirally through the second chamber and leaves through an outlet (advantageously at the periphery).

An electrical voltage is impressed across the cathode-anode arrangement in both embodiments to cause metallic silver to plate out on the cathode (on one side, or both sides, depending upon which embodiment is used).

Upon completion of a plating operation the cathode can be removed and sent to a refiner for a conventional silver recovery operation, being replaced by a new cathode for subsequent reuse of the cell. Alternatively, the entire cell can be returned for silver recovery.

THE DRAWINGS

THE PREFERRED EMBODIMENTS

Figure 1:
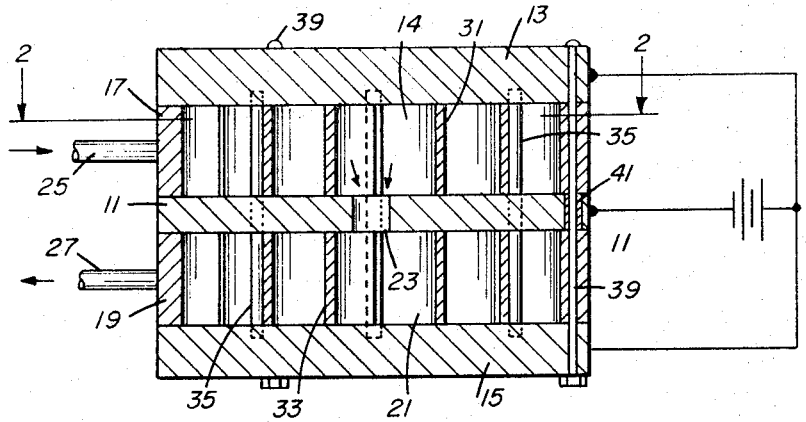
FIG. 1 is a vertical sectional view of a double chamber electrolytic cell taken along the line 1—1 in FIG. 2.
Figure 2:
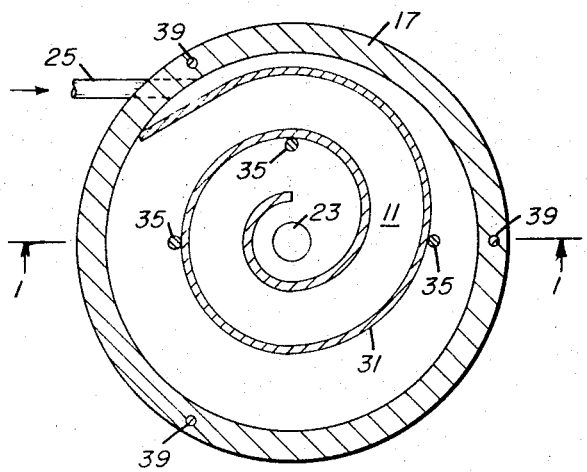
FIG. 2 is an elevational view, partly in section, taken along the line 2—2 in FIG. 1 for the upper cell (a view through the lower cell would be the same)

FIGS. 1 and 2 show a double chamber cell comprising a single cathode 11 in the form of a flat metal plate or sheet and two metal anodes 13 and 15 in the form of flat metal plates or sheets which are parallel to and spaced from cathode 11 on opposite sides thereof. All electrodes can be of stainless steel, but other preferred anode materials are carbon or platinized titanium.

An annular wall 17 of dielectric material such as glass, hard rubber, wood, or a synthetic resin such as poly(methyl methacrylate) is clamped between anode 13 and cathode 11 to form therewith an internal chamber 14 which may be circular in shape. A similar annular wall 19 of dielectric material is clamped between the opposite side of cathode 11 and anode 15 to form a second circular chamber 21. A central bore 23 in cathode 11 establishes communication between the two chambers.

An inlet conduit 25 for supply of electrolyte extends through wall 17 and discharges tangentially into chamber 14. A similar outlet conduit 27 extends tangentially from chamber 21 to the exterior for removing electrolyte.

For efficient silver recovery and uniform plating it is essential to provide vigorous and uniform agitation of the electrolyte as it flows through the cells. This is accomplished by providing in each chamber identical spiral partitions 31, 33 of dielectric material such as a synthetic resin, for example poly(methyl methacrylate), polyethylene, polypropylene, polyvinyl chloride, polystyrene or phenol-formaldehyde plastic. Spiral partition 31 at its outer extremity is positioned adjacent inlet 25, and at its inner extremity adjacent central outlet 23 so that the electrolyte flows at high velocity in a spiral pattern from inlet to outlet, and thence into the center of the second chamber 21 through which it flows spirally to the outlet 27.

The coils of the partitions are supported, and turbulence is assisted, by providing a plurality of posts 35 which are embedded or otherwise fixed in one or both of the opposed electrodes at spaced positions. The posts are formed of materials similar to the partitions 31, 33. However, when the spiral partitions are sufficiently rigid, no support posts are needed.

The elements of the two-chamber cell described above can be held together in any desired way. For example, a plurality of bolts 39 can be used, while avoiding conductive contact with cathode 35 by proper spacing or by providing insulating sleeves 41.

A two-chamber cell constructed as described above has been tested successfully for recovering metallic silver from a photographic fixing solution containing complex silver salts.

Chambers 14 and 21 are 1 inch high, as are the spirals 31 and 33, and channel width between coils of the spirals is ¾ inch. Each anode has an area of one square foot facing the cathode, and the cathode has an area of two square feet on two surfaces. All electrodes are 3/16 inch thick stainless steel. The cell is run at a current density of 12.5–15 amps/ft.$^2$ and electrolyte is pumped through the cell at a flow rate of 32 liters/min. A good hard silver plate is obtained on both surfaces of cathode 11 when treating electrolyte containing between 0.95 and 5.1 grams/liter of silver, and no sulfiding occurs.

Figure 3:
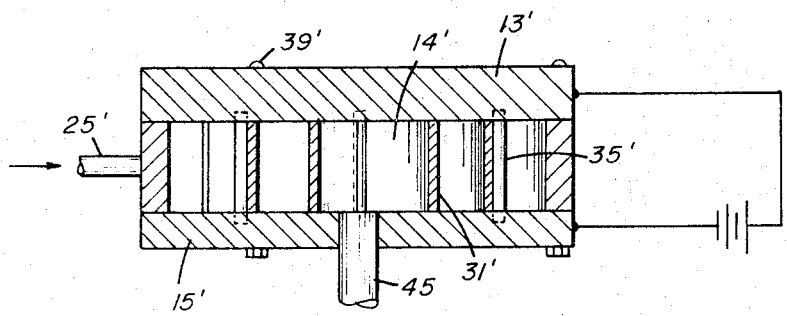
FIG. 3 is a vertical sectional view of a single chamber electrolytic cell.

The single chamber cell shown in FIG. 3 is identical to the top section of the cell in FIG. 1. However, electrolyte leaving the chamber 14' enters a discharge conduit 45 and is discarded or recycled. Of course, only one side of cathode 15' is coated with silver, but the other important advantages of the invention are secured.

Generally it is advantageous for my novel cell to be a disposable, one time use cell, thus avoiding the possibility of short circuits such as may occur if silver deposits on the insulating separators 17, 19 and forms a conducting bridge from cathode to anode. The more often a given cell is used, the more this is apt to occur.

To recapitulate, important features of the cells described above are:

(1) Flow of electrolyte through a spiral channel as described provides uniform agitation throughout, with resultant uniform silver plate.

(2) The sealed chambers allow very high agitation with external pumping.

(3) Fully turbulent flow is maintained with a high Reynolds number in excess of 30,000 at the nominal flow rate of 32 liters/min.

(4) Support posts or rods 35 between spiral convolutions act as tripping devices to prevent motionless boundary layers from building up, thus enhancing mass transfer characteristics.

(5) High current density as a result of high agitation gives improved electrical efficiency and reduces the possibility of sulfiding.

(6) There are no moving parts to require maintenance.

(7) Manufacturing cost is low, plastic members can be molded, and flat electrodes are easily fabricated.

(8) Design is simple and compact.

(9) The cells are easily disassembled so that the silver can be peeled off or otherwise removed from the cathode.

This invention constitutes an improvement on the cell described in U.S. Pat. 3,728,244, granted Apr. 17, 1973.

The invention has been described in detail with particular reference to preferred embodiments thereof, but it will be understood that variations and modifications can be effected within the spirit and scope of the invention.

I claim:

1. A method for recovering a metal from a solution containing ions of said metal comprising flowing said solution into, through, and out of a pair of electrolysis chambers defined between a first electrode of one sign forming a common wall of said chambers and two other electrodes both of sign opposite said first electrode parallel to, and spaced on opposite sides from, said first electrode;

causing said solution to follow generally spiral paths in said chambers extending between the periphery and the center thereof; and impressing a D.C. electrical potential across said first electrode and both of said two other electrodes of sufficient magnitude to cause said metal to plate out;

said solution being introduced into a first one of said chambers at the periphery thereof and following said generally spiral path to a first outlet at the center thereof, said solution passing through said first outlet into the center of a second one of said chambers and following said generally spiral path through said second one of said chambers to a second outlet at the periphery thereof.

2. A method in accordance with claim 1 wherein said first electrode is a cathode and said two other electrodes are both anodes, said metal plating out on both sides of said cathode.

3. An electrolytic cell for recovering a metal from an electrolyte solution containing ions of said metal comprising:

a flat anode;

a flat cathode spaced from and parallel to said anode;

an annular wall of dielectric material between said cathode and said anode and forming therewith an internal chamber, said wall electrically insulating said cathode from said anode;

a spiral partition of dielectric material in said chamber between said anode and said cathode and so constructed and arranged as to form a spiral path for flow of electrolyte extending from the periphery of said chamber to the center thereof;

an inlet for electrolyte solution adjacent one extremity of said spiral partition; and an outlet for electrolyte solution adjacent the opposite extremity of said spiral partition.

4. An electrolytic cell in accordance with claim 3, also comprising a plurality of retaining posts of dielectric material in said chamber extending between said anode and said cathode, and engaging said spiral partition, said posts acting both to hold said partition in place and to develop turbulence in the electrolyte flowing through said cell.

5. An electrolytic cell in accordance with claim 3 wherein said inlet is adjacent the periphery of said chamber, and said outlet is adjacent the center thereof.

6. An electrolytic cell in accordance with claim 3, in combination with means for impressing a direct current voltage between said cathode and said anode.

7. An electrolytic cell comprising:
a flat first electrode;
a flat second electrode spaced from and parallel to said first electrode;
a first annular wall of dielectric material between said first and second electrodes and forming therewith an internal first chamber;
a flat third electrode spaced from and parallel to said second electrode on the opposite side thereof from said first electrode;
a second annular wall of dielectric material between said second and third electrodes, and forming therewith a second internal chamber;
an inlet for electrolyte solution into said first chamber;
an outlet from said first chamber for electrolyte solution comprising an aperture extending through said second electrode and passing electrolyte into said second chamber;
and an outlet for electrolyte solution from said second chamber;
said first and third electrodes being adapted to be connected to one side of a source of direct current, and said second electrode being adapted to be connected to the opposite side of said source.

8. An electrolytic cell comprising:
a flat first electrode;
a flat second electrode spaced from and parallel to said first electrode;
a first annular wall of dielectric material between said first and second electrodes and forming therewith an internal first chamber, said first wall electrically insulating said first electrode from said second electrode;
a first spiral parition of dielectric material in said first chamber so constructed and arranged as to form a spiral path for flow of electrolyte extending from the periphery of said first chamber to the center thereof;
a flat third electrode spaced from and parallel to said second electrode on the opposite side thereof from said first electrode;
a second annular wall of dielectric material between said second and third electrodes, and forming therewith a second internal chamber, said second wall electrically insulating said second electrode from said third electrode;
a second spiral partition of dielectric material in said second chamber so constructed and arranged as to form a spiral path for flow of electrolyte extending from the periphery of said second chamber to the center thereof;
an inlet for electrolyte solution adjacent one extremity of said first spiral partition;
an outlet for electrolyte solution adjacent the opposite extremity of said first spiral partition, and comprising an aperture extending through said second electrode and passing electrolyte into said second chamber adjacent an extremity of said second spiral partition;
and an outlet for electrolyte solution from said second chamber adjacent the opposite extremity of said second spiral partition;
said first and third electrodes being adapted to be connected to one side of a source of direct current, and said second electrode being adapted to be connected to the opposite side of said source.

9. An electrolytic cell in accordance with claim 8 wherein said first and third electrodes are anodic and said second electrode is cathodic.

10. An electrolytic cell in accordance with claim 8 wherein said first and third electrodes are cathodic and said second electrode is anodic.

11. An electrolytic cell is accordance with claim 8, in combination with a source of direct current having one side thereof connected to both said first and third electrodes, and having the other side thereof connected to said second electrode.

References Cited
UNITED STATES PATENTS 3,467,553    9/1969    White ---------- 136—120 F C

FOREIGN PATENTS 14,631    5/1897    Switzerland --------- 204—263

HOWARD S. WILLIAMS, Primary Examiner

W. I. SOLOMON, Assistant Examiner

U.S. Cl. X.R.

204—273, 275